(12) United States Patent
Takagawa et al.

(10) Patent No.: US 6,458,286 B1
(45) Date of Patent: Oct. 1, 2002

(54) MANGANESE-ZINC (MN-ZN) BASED FERRITE

(75) Inventors: Kenya Takagawa; Katsushi Yasuhara, both of Tokyo (JP)

(73) Assignee: TDK Corporation, Tokyo (JP)

( * ) Notice: Subject to any disclaimer, the term of this patent is extended or adjusted under 35 U.S.C. 154(b) by 43 days.

(21) Appl. No.: 09/649,577

(22) Filed: Aug. 29, 2000

(30) Foreign Application Priority Data

Aug. 30, 1999 (JP) .............................. 11-242747

(51) Int. Cl.$^7$ ................................ H01F 1/34
(52) U.S. Cl. ................ 252/62.62; 252/62.58; 252/62.59
(58) Field of Search ............ 252/62.62, 62.59, 252/62.58

(56) References Cited

FOREIGN PATENT DOCUMENTS

| JP | 60-132301 | | 7/1985 |
| JP | 4-318904 | * | 11/1992 |
| JP | 6-283320 | | 10/1994 |
| JP | 7-297020 | | 11/1995 |
| JP | 10-064715 | | 3/1998 |

* cited by examiner

Primary Examiner—C. Melissa Koslow

(57) ABSTRACT

MnZn ferrite comprises a main component comprising iron oxide 52.5 to 54.0 mol % in terms of Fe2O3, zinc oxide 7.7 to 10.8 mol % in terms of ZnO, and manganese oxide of the remaining, and sub-components of silicon oxide 60 to 140 ppm in terms of SiO$_2$ and calcium oxide 350 to 700 ppm in terms of CaO, and further contains nickel oxide 4500 ppm or lower (not including 0) in terms of NiO.

10 Claims, 3 Drawing Sheets

MANGANESE-ZINC (MN-ZN) BASED FERRITE

BACKGROUND OF THE INVENTION

The present invention relates to a high performance manganese zinc ferrite (Mn—Zn ferrite) with small core loss and high magnetic flux density, and in particular to a Mn—Zn ferrite suited to ferrite cores for transformers of power supply.

Ferrite cores for transformers to be used to an electric source have been demanded for low core loss and high saturation magnetic flux density going with nowadays miniaturization and high efficiency of electronic devices.

Accordingly, ferrite such as under mentioned has conventionally been proposed.

JP-A-60-132301 proposes a ferrite contains CaO and $Nb_2O_5$ in a basic composition comprising $Fe_2O_3$, MnO and ZnO, and further contains one of $SiO_2$, $V_2O_5$, $Al_2O_3$, CoO, CuO and $ZrO_2$ to reduce core loss. However, for realizing miniaturization and high efficiency of transformers, further reduction of the core loss is required, and no consideration has been taken at all for saturation magnetic flux density being as one of important requisite properties together with the core loss.

JP-A-7-297020 improves the core loss at 100° C. by Sn and Ti in the ferrite. In general, it is known that when Sn or Ti is added to Mn—Zn ferrite, a temperature that the core loss indicates a minimum ("minimum temperature" hereafter) is shifted to a low temperature. Accordingly, unless Fe or Zn is decreased in company with the contents of Sn or Ti, the temperature characteristic of the core loss is deviated. At this time, the core loss at high temperature increases and the saturation magnetic flux density decreases. In addition, as Sn and Ti are non-magnetic, the saturation magnetic flux density decreases.

JP-A-10-64715 contains a basic composition of $Fe_2O_3$, MnO, ZnO and NiO, and further contains one or two kinds or more of Ta2O5, $ZrO_2$, $Nb_2O_5$, $V_2O_5$, $TiO_2$ and $HfO_2$ to improve the core loss and the saturation magnetic flux density. Although the high saturation magnetic flux density is provided at a high temperature range because of containing NiO, a magnetic anisotropy is assumed to be large since NiO content is as much as 0.5 to 4 mol % (0.3 to 2.5 wt %), and the core loss is scarcely improved.

SUMMARY OF THE INVENTION

Accordingly, it is an object of the invention to offer a high performance manganese zinc (Mn—Zn) ferrite of higher saturation magnetic flux density and low loss at core mounting temperature for transformers for satisfying such demands.

The object of the invention can be accomplished by the followings.

According to the present invention, Mn—Zn ferrite comprises a main component comprising iron oxide 52.5 to 54.0 mol % in terms of $Fe_2O_3$, zinc oxide 7.7 to 10.8 mol % in terms of ZnO, and the remaining being MnO, and sub-components of silicon oxide 60 to 140 ppm in terms of $SiO_2$, calcium oxide 350 to 700 ppm in terms of CaO, and nickel oxide 4500 ppm or lower (not including 0) in terms of NiO.

Preferably, Mn—Zn ferrite as set forth the above may contain zinc oxide 9.1 to 10.8 mol % in terms of ZnO.

Preferably, Mn—Zn ferrite as set forth the above may contains nickel oxide less than 3000 ppm (not including 0) in terms of NiO.

Preferably, MnZn ferrite as set forth in the above may contain sub-components of niobium oxide 100 to 350 ppm in terms of $Nb_2O_5$ and zirconium oxide 350 ppm or lower (including 0) in terms of ZrO2 to follow an under formula of $$400 \text{ (ppm)} \leq ZrO_2 \text{ (ppm)} + 2*Nb_2O_5 \text{ (ppm)} \leq 800 \text{ (ppm)}.$$

Preferably, it is included zirconium oxide 50 to 350 ppm in terms of ZrO2.

Preferably, Mn—Zn ferrite as set forth the above may contain phosphorous P less than 30 ppm for the main component.

Preferably, Mn—Zn ferrite as set forth the above may contain boron B less than 30 ppm for the main component.

Thereby, the under mentioned working effects are exhibited.

It is possible to provide a MnZn ferrite of very small core loss and high saturation magnetic flux density in a core for transformer to be used nearly at 100° C. In addition, it is possible to select a composition of low core loss and high saturation magnetic flux density.

By containing ZnO 9.1 to 10.8 mol %, a temperature dependency of the core loss at higher temperature than 100° C. is reduced, and it is easy to manufacture MnZn ferrite of smaller core loss than prior art ones.

Since nickel oxide is contained less than 3000 ppm in terms of NiO, a MnZn ferrite of smaller core loss may be obtained.

As niobium oxide 100 to 350 ppm in terms of $Nb_2O_5$ and zirconium oxide 350 ppm in terms of $ZrO_2$ are contained in the range of 400 (ppm)$\leq ZrO_2$ (ppm)+2*$Nb_2O_5$ (ppm)$\leq 800$ (ppm), a MnZn ferrite of small core loss may be obtained.

Further, in the above Mn—Zn ferrite, since zirconium oxide 50 to 350 ppm in terms of $ZrO_2$ is contained, a MnZn ferrite of still smaller core loss may be obtained.

Since phosphorous P is contained 30 ppm or lower for the main component, a Mn—Zn ferrite of small core loss is available.

Since boron B is contained 30 ppm or lower for the main component, a Mn—Zn ferrite of small core loss is also available.

BRIEF DESCRIPTION OF THE PREFERRED EMBODIMENTS

DETAILED DESCRIPTION OF THE PREFERRED EMBODIMENTS

Modes for carrying out the invention will be explained with reference to Tables 1 to 7 and FIGS. 1 to 6. Tables 1, 3, 5 show compositions of samples showing Examples of the invention and Comparative examples, while Tables 2, 4, 6 show characteristic values of the samples shown in Tables 1, 3, 5. Table 7 shows compositions of FIGS. 1 to 3.

Figure 1:
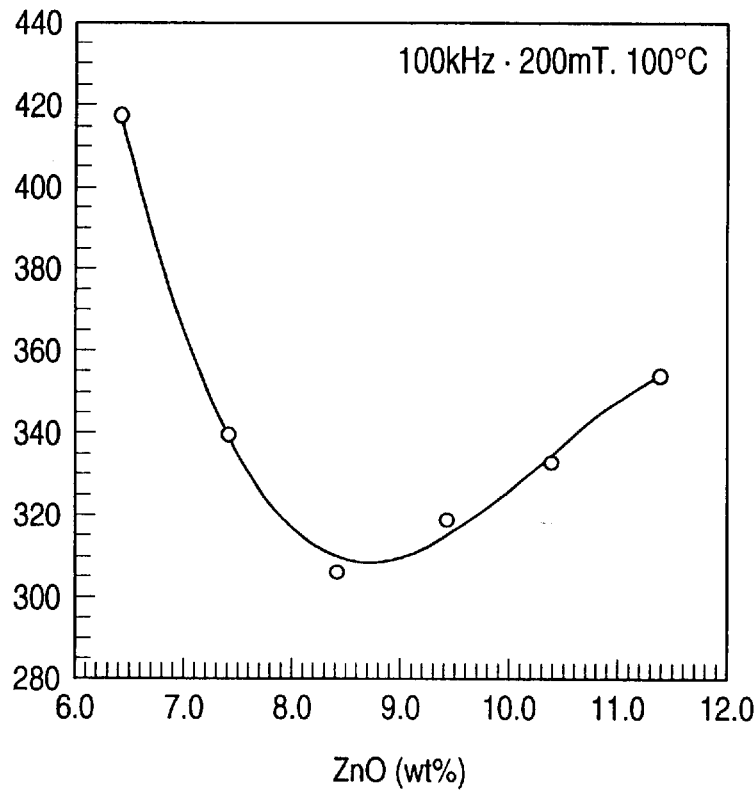
FIG. 1 shows changing of the core loss at 100° C. by the main component.
Figure 2:
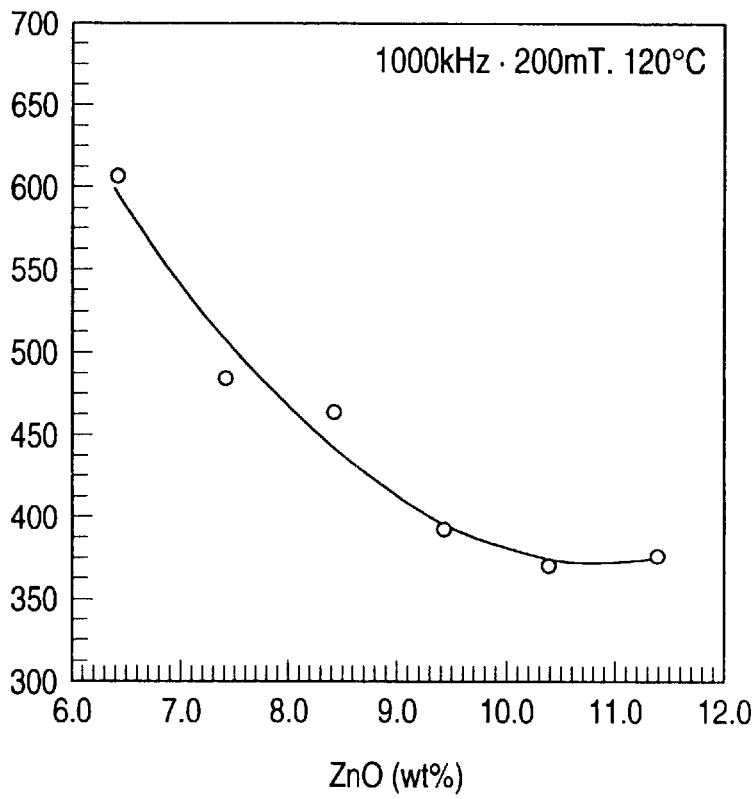
FIG. 2 shows changing of the core loss at 120° C. by the main component.
Figure 3:
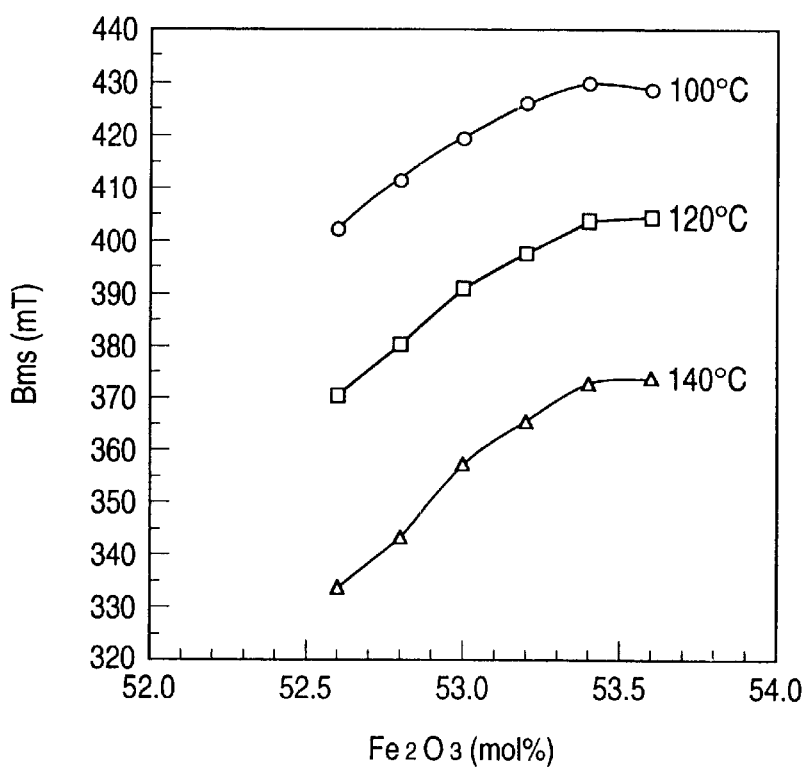
FIG. 3 shows changing of the saturation magnetic flux density at high temperature by the main components.
Figure 4:
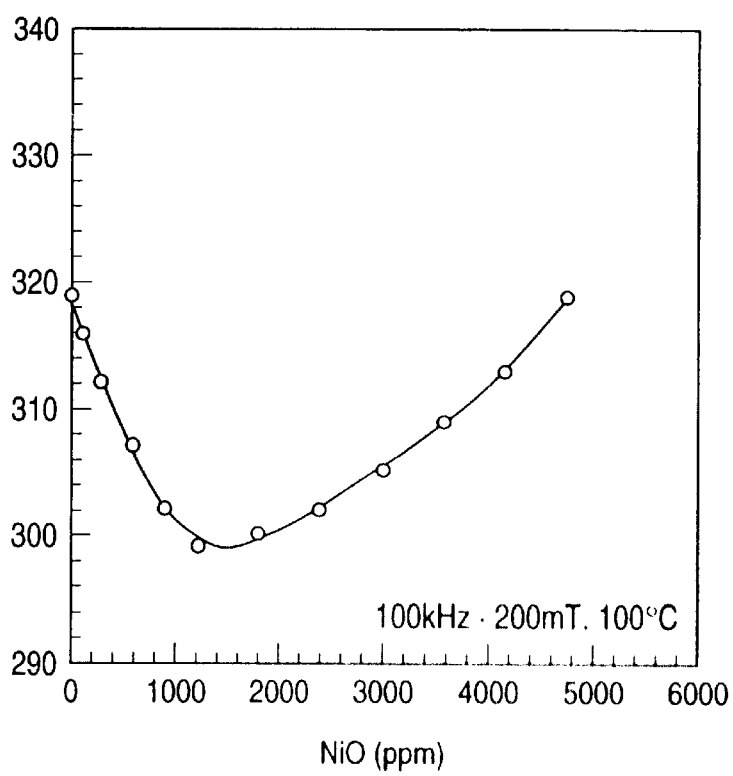
FIG. 4 shows changing of the core loss at 100° C. by the Ni content.
Figure 5:
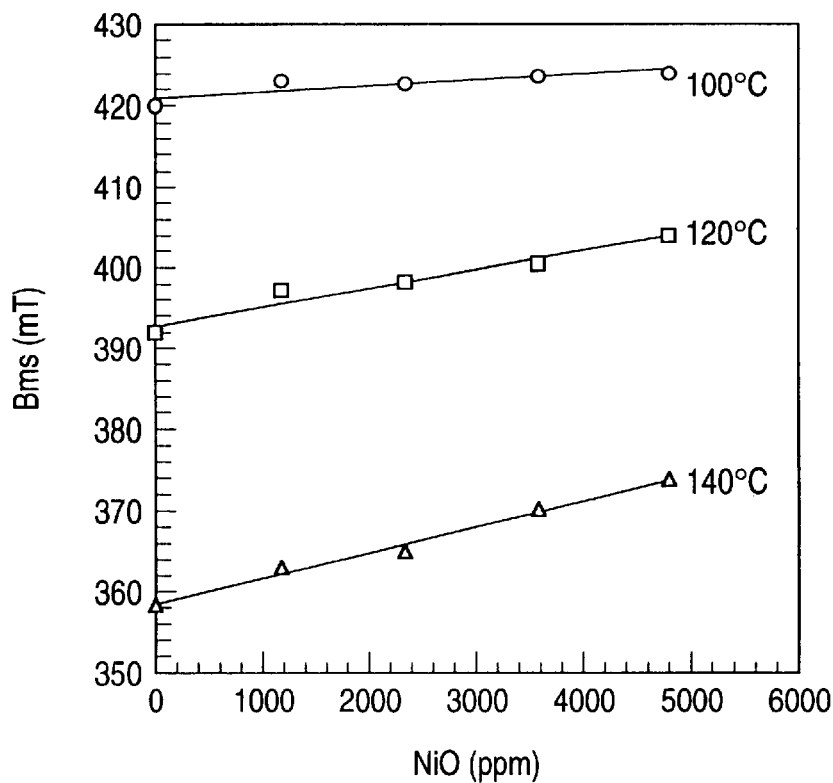
FIG. 5 shows changing of the saturation magnetic flux density at high temperature by the Ni content.
Figure 6:
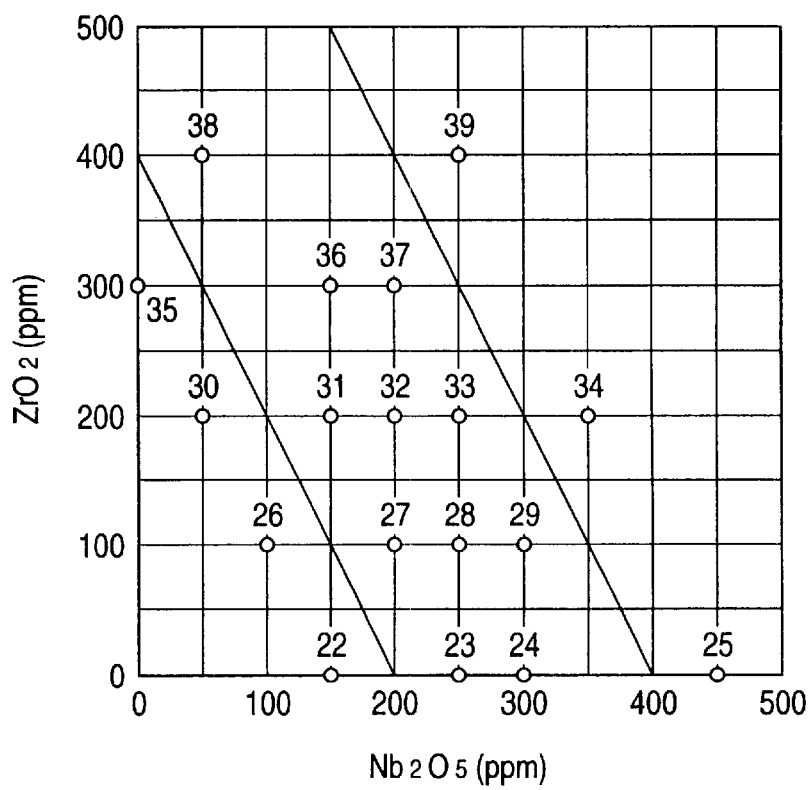
FIG. 6 shows the relation between Nb and Zr of the Samples Nos. 23 to 39.

FIG. 1 shows changing of the core loss at 100° C. of the main component, in which the minimum temperature of the core loss is 100° C. FIG. 2 shows changing of the core loss at 120° C. of the main component, and the sample thereof is the same as FIG. 1 and the minimum temperature of the core loss is also 100° C. as FIG. 1. FIG. 3 shows changing of the saturation magnetic flux density at high temperature of the main component. FIG. 4 shows changing of the core loss at 100° C. of the Ni content, showing the characteristics of Sample No. 7 (point of NiO=0 ppm) to Sample 17 (point of NiO=4800 ppm) and No. 4 (point NiO=1200 ppm). FIG. 5 shows changing of the saturation magnetic flux density at high temperature of the Ni content, showing the characteristics of Samples Nos. 7, 4, 13 (points of NiO=2400 ppm), 15 (point of NiO=3600 ppm) and 17. FIG. 6 shows the relation between Nb and Zr contents, and Nos. 23, 24, Nos. 27 to 29, Nos. 31 to 33 and Nos. 36, 37 of Samples between two oblique lines are included in claim 4, and Nos. 23 and 24 are included in claim 4 but not in claim 5. Ferrite cores of compositions shown in Tables 1, 3 and 5 are produced. At this time, calcined main components and raw materials of sub-components are mixed, and P and B will be referred to later.

$Fe_2O_3$, $Mn_3O_4$ and ZnO were employed as starting raw materials of the main components. They were weighed such that the components after calcining would be as shown in Tables 1, 3 and 5, wet-mixed, followed by drying by a spray dryer, and calcined at 900° C. for 2 hours in an air.

NiO, $SiO_2$, $CaCO_3$, $Nb_2O_5$ and $ZrO_2$ were employed as starting raw materials of the sub-components. They were weighed such that the components after calcining would be as shown in Tables 1, 3 and 5, and the raw materials of these sub-components were added to the calcined raw materials of the main components and mixed while wet-pulverizing. The pulverization was continued until average particle size of the calcined materials became 2 μm.

Not only the raw materials of the above mentioned main components but also powder of compound oxide containing metals of two kinds or more may be used as raw materials of main components. The powder of such compound oxide is ordinarily made by oxidation-roasting chloride. For example, if a solution containing iron chloride, manganese chloride and zinc chloride is oxidation-roasted, powder of the compound oxide containing Fe, Mn and Zn may be obtained. This compound oxide generally contains a spinel phase. Only, zinc chloride has high vaper pressure and easily causes divergence in the composition. Thus, it is sufficient that the powder of the compound containing Fe and Mn is made by using a solution containing iron chloride and manganese chloride, and this powder is mixed with powder of zinc oxide or powder zinc ferrite so as to produce a raw material of a main component. In case the powder of the compound oxide made by the oxidation-roasting is used as the raw material of the main component, the calcining is not necessary.

The thus obtained mixture was added with PVA as a binder and granulated to around 80 to 200 μm by the spray dryer. Thereafter, the granules were formed under pressure into toroidal shaped samples of outer diameter of 31 mm, inner diameter 19 mm and thickness 8 mm by sintering at 1300° C. for 5 hours in an atmosphere controlled in oxygen partial pressure.

The sub-components P and B were resulted from the raw materials such as Fe2O3. The P content was measured by an absoptiometric method, and the B content was measured by ICP (high frequency plasma emission analysis method).

For the raw materials of the main components and the sub-components may be employed other than those used in the Examples.

TABLE 1

| | Sample No. | $Fe_2O_3$ (mol %) | MnO (mol %) | ZnO (mol %) | NiO (ppm) | $SiO_2$ (ppm) | CaO (ppm) |
|---|---|---|---|---|---|---|---|
| Com. | 1 | 53.8 | 39.8 | 6.4 | 1200 | 120 | 550 |
| Com. | 2 | 53.6 | 39.0 | 7.4 | 1200 | 120 | 550 |
| Ex. | 3 | 53.4 | 38.2 | 8.4 | 1200 | 120 | 550 |
| Ex. | 4 | 53.2 | 37.4 | 9.4 | 1200 | 120 | 550 |
| Ex. | 5 | 53.0 | 36.5 | 10.5 | 1200 | 120 | 550 |
| Com. | 6 | 52.8 | 35.7 | 11.5 | 1200 | 120 | 550 |
| Com. | 7 | 53.0 | 37.6 | 9.4 | 0 | 120 | 550 |
| Ex. | 8 | 53.0 | 37.6 | 9.4 | 100 | 120 | 550 |
| Ex. | 9 | 53.1 | 37.5 | 9.4 | 300 | 120 | 550 |
| Ex. | 10 | 53.1 | 37.5 | 9.4 | 600 | 120 | 550 |
| Ex. | 11 | 53.2 | 37.4 | 9.4 | 900 | 120 | 550 |
| Ex. | 12 | 53.3 | 37.3 | 9.4 | 1800 | 120 | 550 |
| Ex. | 13 | 53.4 | 37.2 | 9.4 | 2400 | 120 | 550 |
| Ex. | 14 | 53.5 | 37.1 | 9.4 | 3000 | 120 | 550 |
| Ex. | 15 | 53.6 | 37.0 | 9.4 | 3600 | 120 | 550 |
| Ex. | 16 | 53.7 | 36.8 | 9.4 | 4200 | 120 | 550 |
| Com. | 17 | 53.8 | 36.7 | 9.4 | 4800 | 120 | 550 |
| Com. | 18 | 53.2 | 37.4 | 9.4 | 1200 | 40 | 550 |
| Com. | 19 | 53.2 | 37.4 | 9.4 | 1200 | 160 | 550 |
| Com. | 20 | 53.2 | 37.4 | 9.4 | 1200 | 120 | 250 |
| Com. | 21 | 53.2 | 37.4 | 9.4 | 1200 | 120 | 800 |

Ex.: Example
Com.: Comparative Example

TABLE 2

| | Sample No. | Tmin. (° C.) | Pcv at Tmin. (KW/m3) | Bms at 100° C. (mT) |
|---|---|---|---|---|
| Com. | 1 | 100 | 397 | 435 |
| Com. | 2 | 100 | 320 | 437 |
| Ex. | 3 | 100 | 286 | 430 |
| Ex. | 4 | 100 | 299 | 423 |
| Ex. | 5 | 100 | 314 | 416 |
| Com. | 6 | 100 | 335 | 407 |
| Com. | 7 | 100 | 319 | 420 |
| Ex. | 8 | 100 | 316 | 420 |
| Ex. | 9 | 100 | 312 | 421 |
| Ex. | 10 | 100 | 307 | 422 |
| Ex. | 11 | 100 | 302 | 422 |
| Ex. | 12 | 100 | 300 | 423 |
| Ex. | 13 | 100 | 302 | 423 |
| Ex. | 14 | 100 | 305 | 424 |
| Ex. | 15 | 100 | 309 | 424 |
| Ex. | 16 | 100 | 313 | 424 |
| Com. | 17 | 100 | 319 | 424 |
| Com. | 18 | 100 | 427 | 421 |
| Com. | 19 | 100 | 374 | 424 |
| Com. | 20 | 100 | 485 | 423 |
| Com. | 21 | 100 | 376 | 424 |

Com.: Comparative Example
Ex.: Example
Tmin.: Minimum temperature of core loss
Pcv: Core loss
Bms: Saturation magnetic flux density

TABLE 3

| Sample No. | Fe$_2$O$_3$ (mol %) | MnO (mol %) | ZnO (mol %) | NiO (ppm) | SiO$_2$ (ppm) | CaO (ppm) | Nb$_2$O$_5$ (ppm) | ZrO$_2$ (ppm) |
|---|---|---|---|---|---|---|---|---|
| Com. 22 | 53.2 | 37.4 | 9.4 | 1200 | 90 | 500 | 150 | 0 |
| Ex. 23 | 53.2 | 37.4 | 9.4 | 1200 | 90 | 500 | 250 | 0 |
| Ex. 24 | 53.2 | 37.4 | 9.4 | 1200 | 90 | 500 | 300 | 0 |
| Com. 25 | 53.2 | 37.4 | 9.4 | 1200 | 90 | 500 | 450 | 0 |
| Com. 26 | 53.2 | 37.4 | 9.4 | 1200 | 90 | 500 | 100 | 100 |
| Ex. 27 | 53.2 | 37.4 | 9.4 | 1200 | 90 | 500 | 200 | 100 |
| Ex. 28 | 53.2 | 37.4 | 9.4 | 1200 | 90 | 500 | 250 | 100 |
| Ex. 29 | 53.2 | 37.4 | 9.4 | 1200 | 90 | 500 | 300 | 100 |
| Com. 30 | 53.2 | 37.4 | 9.4 | 1200 | 90 | 500 | 50 | 200 |
| Ex. 31 | 53.2 | 37.4 | 9.4 | 1200 | 90 | 500 | 150 | 200 |
| Ex. 32 | 53.2 | 37.4 | 9.4 | 1200 | 90 | 500 | 200 | 200 |
| Ex. 33 | 53.2 | 37.4 | 9.4 | 1200 | 90 | 500 | 250 | 200 |
| Com. 34 | 53.2 | 37.4 | 9.4 | 1200 | 90 | 500 | 350 | 200 |
| Com. 35 | 53.2 | 37.4 | 9.4 | 1200 | 90 | 500 | 0 | 300 |
| Ex. 36 | 53.2 | 37.4 | 9.4 | 1200 | 90 | 500 | 150 | 300 |
| Ex. 37 | 53.2 | 37.4 | 9.4 | 1200 | 90 | 500 | 200 | 300 |
| Com. 38 | 53.2 | 37.4 | 9.4 | 1200 | 90 | 500 | 50 | 400 |
| Com. 39 | 53.2 | 37.4 | 9.4 | 1200 | 90 | 500 | 250 | 400 |

Ex.: Example
Com.: Comparative Example

TABLE 4

| Sample No. | Tmin. (° C.) | Pcv. at Tmin. (KW/m3) | Bms at 100° C. (mT) |
|---|---|---|---|
| Com. 22 | 100 | 291 | 422 |
| Ex. 23 | 100 | 263 | 424 |
| Ex. 24 | 100 | 267 | 423 |
| Com. 25 | 100 | 362 | 422 |
| Com. 26 | 100 | 282 | 423 |
| Ex. 27 | 100 | 249 | 422 |
| Ex. 28 | 100 | 244 | 423 |
| Ex. 29 | 100 | 251 | 424 |
| Com. 30 | 100 | 298 | 423 |
| Ex. 31 | 100 | 253 | 423 |
| Ex. 32 | 100 | 249 | 422 |
| Ex. 33 | 100 | 259 | 423 |
| Com. 34 | 100 | 321 | 423 |
| Com. 35 | 100 | 322 | 422 |
| Ex. 36 | 100 | 256 | 424 |
| Ex. 37 | 100 | 259 | 423 |
| Com. 38 | 100 | 287 | 423 |
| Com. 39 | 100 | 298 | 422 |

Tmin.: Minimum temperature of core loss
Pcv: Core loss
Bms: Saturation magnetic flux density

TABLE 6

| Sample No. | Tmin. (° C.) | Pcv at Tmin. (KW/m3) | Bms at 100° C. (mT) |
|---|---|---|---|
| Ex. 40 | 100 | 244 | 423 |
| Ex. 41 | 100 | 253 | 425 |
| Ex. 42 | 100 | 268 | 426 |
| Com. 43 | 100 | 295 | 424 |
| Ex. 44 | 100 | 246 | 423 |
| Ex. 45 | 100 | 250 | 424 |
| Ex. 46 | 100 | 262 | 425 |
| Com. 47 | 100 | 287 | 424 |

Tmin.: Minimum temperature of core loss
Pcv: Core loss
Bms: Saturation magnetic flux density

TABLE 7

| Fe2O3 (mol %) | MnO (mol %) | ZnO (mol %) | A* |
|---|---|---|---|
| 53.6 | 40.0 | 6.4 | 100 |
| 53.4 | 39.2 | 7.4 | 100 |
| 53.2 | 38.4 | 8.4 | 100 |
| 53.0 | 37.6 | 9.4 | 100 |

TABLE 5

| Sample No. | Fe$_2$O$_3$ (mol %) | MnO (mol %) | ZnO (mol %) | NiO (ppm) | SiO$_2$ (ppm) | CaO (ppm) | Nb$_2$O$_5$ (ppm) | ZrO$_2$ (ppm) | P (ppm) | B (ppm) | S (ppm) |
|---|---|---|---|---|---|---|---|---|---|---|---|
| Ex. 40 | 53.2 | 37.4 | 9.4 | 1200 | 90 | 500 | 250 | 100 | 5 | 0 | 0 |
| Ex. 41 | 53.2 | 37.4 | 9.4 | 1200 | 90 | 500 | 250 | 100 | 15 | 0 | 0 |
| Ex. 42 | 53.2 | 37.4 | 9.4 | 1200 | 90 | 500 | 250 | 100 | 25 | 0 | 0 |
| Com. 43 | 53.2 | 37.4 | 9.4 | 1200 | 90 | 500 | 250 | 100 | 35 | 0 | 0 |
| Ex. 44 | 53.2 | 37.4 | 9.4 | 1200 | 90 | 500 | 250 | 100 | 5 | 5 | 0 |
| Ex. 45 | 53.2 | 37.4 | 9.4 | 1200 | 90 | 500 | 250 | 100 | 5 | 15 | 0 |
| Ex. 46 | 53.2 | 37.4 | 9.4 | 1200 | 90 | 500 | 250 | 100 | 5 | 25 | 0 |
| Com. 47 | 53.2 | 37.4 | 9.4 | 1200 | 90 | 500 | 250 | 100 | 5 | 35 | 0 |

Ex.: Example
Com. Ex.: Comparative Example

TABLE 7-continued

| Fe2O3 (mol %) | MnO (mol %) | ZnO (mol %) | A* |
|---|---|---|---|
| 52.8 | 36.7 | 10.5 | 100 |
| 52.6 | 35.9 | 11.5 | 100 |

A*: Minimum temperature (° C.) of Core loss

Each of the Sample was impressed with sinusoidal current magnetic field of 100 kHz and 200 mT (maximum value), and the core loss and the saturation magnetic flux density were measured at 100° C., and as a result, the values shown in Tables 2, 4, 6 were obtained. Similarly, the Samples shown in Table 7 were made and the characteristics shown in FIGS. 1 to 3 were measured.

Reasons for limiting numerical values of the invention will be explained mainly with Tables 1 to 6.

In case iron oxide is less than 52.5 mol %, the minimum temperature of the core loss is shifted to the high temperature side.

In case iron oxide exceeds 54.0 mol %, the minimum temperature of the core loss is shifted to the low temperature side.

In case iron oxide is out of the range of 52.5 to 54.0 mol %, as a result, the core loss at 100° C. is large.

In case zinc oxide is 7.7 mol % or lower, the core loss becomes large as 320 kW/m$^3$ or more (see Nos. 1 and 2).

In case zinc oxide is 10.8 mol % or more, the core loss becomes large as 335 kW/m$^3$ or more (see No. 6).

In case silicon oxide is 60 ppm or lower, the core loss becomes large as 427 kW/m$^3$ or more (see No. 18).

In case silicon oxide is 140 ppm or higher, the core loss becomes large as 374 kW/m$^3$ or more (see No. 19).

In case calcium oxide is 350 ppm or lower, the core loss becomes large as 485 kW/m$^3$ or more (see No. 20).

In case calcium oxide is 700 ppm or higher, the core loss becomes large as 376 kW/m$^3$ or more (see No. 21).

In case nickel oxide is 4500 ppm or higher, the core loss becomes large as 319 kW/m$^3$ or more (see No. 17).

In case nickel oxide is 0, the core loss becomes large as 319 kW/m$^3$ (see No. 7).

In MnZn ferrite, by containing zinc oxide 9.1 to 10.8 mol %, such MnZn ferrite is obtained that the temperature characteristic of the core loss is even in the use at high temperature as shown in FIG. 2. In general, transformers for electric devices are often used at ambient temperature being around 100° C., and depending on usage, temperature is heightened until 120 to 140° C. Then, quite naturally, a low loss at high temperature is required. For example, at a maximum loading, an ambient temperature increases to 140° C., but ordinarily (50 to 60% of rating), it is advantageous that transformers to be used at around 100° C. are low in loss and the temperature characteristic of the core loss is even. Such MnZn ferrite may be obtained which may be applied to mounting at high density, automobiles or high ambient temperature.

In MnZn ferrite, by containing nickel oxide less than 3000 ppm, the core loss may be still more reduced (compare No. 13 with No. 15).

In case niobium oxide is 100 ppm or higher, MnZn ferrite of small core loss is obtained as apparently from the comparison of No. 30 and No. 31, and in case niobium oxide exceeds 350 ppm, the core loss is large as apparently from the comparison of No. 25 and No. 24. In case zirconium exceeds 350 ppm, the core loss is large as apparently from the comparison of No. 37 and No. 38.

In case zirconium oxide is less than 50 ppm, the core loss is large as apparently from the comparison of No. 23 and No. 28. In case zirconium oxide exceeds 350 ppm, the core loss is large as apparently from the comparison of No. 36 and No. 39.

If the P content exceeds 30 ppm for the main component, the core loss becomes large as apparently from the comparison of No. 42 and No. 43.

If the B content exceeds 30 ppm for the main component, the core loss becomes large as apparently from the comparison of No. 46 and No. 47.

Reasons for limiting numeral values of the composition of the invention will be in other words as follows.

In case the main components are out of the claimed range, MnZn ferrites of high saturation magnetic flux density and low core loss are obtained.

In case SiO$_2$ and CaO are less than the predetermined range, electric resistance is lowered, and the core loss is large.

In case SiO$_2$ exceeds the predetermined range, the core loss is large by abnormal grain growth when sintering.

In case CaO exceeds the predetermined range, the core loss is large.

In case NiO exceeds the predetermined range, the core loss increases.

In case Nb$_2$O$_5$ and ZrO$_2$ are out of the predetermined range, the core loss large.

In case P and B exceed the claimed range, the core loss is large by abnormal grain growth when sintering.

As mentioned in JP-A-7-297020, the ferrite is improved in the core loss at 100° C. It is known that when Sn or Ti is added to MnZn ferrite, the minimum temperature of the core loss is shifted to a low temperature. Accordingly, unless Fe or Zn is decreased in company with the amount of Sn or Ti, the temperature characteristic of the core loss is deviated, and the core loss at high temperature increases (FIG. 2) and the saturation magnetic flux density decreases (FIG. 3). In addition, as Sn and Ti are non-magnetic, the saturation magnetic flux density decreases.

The invention improves the core loss by adding Ni differently from the above mentioned technology. The measuring points of FIG. 4 show NiO=0, 100, 300, 600, 900, 1200, 1800, 2400, 3000, 3600, 4200, 4800 (ppm) in Tables 1 and 2, that is, Nos. 7, 8, 9, 10, 11, 4, 12, 13, 14, 15, 16, 17.

In the invention, by adding Ni, the minimum temperature is shifted to the high temperature side reversely to Sn or Ti. Accordingly, by increasing Fe or Zn, the temperature characteristic of the core loss is satisfied, so that the composition of the low core loss (FIG. 2) or of the high saturation magnetic flux density (FIG. 3) can be selected. Further, as the curie temperature is heightened by Ni, the saturation magnetic flux density at high temperature can be increased (FIG. 5). The measuring points in FIG. 5 show NiO=0, 1200, 2400, 3600, 4800 of Nos. 7, 4, 13, 15, 17.

It is possible to provide a MnZn ferrite of very small core loss and high saturation magnetic flux density at the core mounting temperature for transformer. In addition, it is possible to select a composition of low core loss and high saturation magnetic flux density.

By containing ZnO 9.1 to 10.8 mol %, a temperature characteristic of the core loss at higher temperature can be made even at the part of the minimum value, so that the range of the minimum value of the temperature characteristic of the core loss is widened and it is easy to manufacture MnZn ferrite of smaller core loss.

Since nickel oxide is contained less than 3000 ppm in terms of NiO, a MnZn ferrite of smaller core loss may be obtained.

As niobium oxide 100 to 350 ppm in terms of $Nb_2O_5$ and zirconium oxide 350 ppm in terms of ZrO2 are contained in the range of 400 (ppm)$\leq ZrO_2$ (ppm)+2*$Nb_2O_5$ (ppm)$\leq$800 (ppm), a MnZn ferrite of small core loss may be obtained.

Further, in the above Mn—Zn ferrite, since zirconium oxide 50 to 350 ppm in terms of $ZrO_2$ is contained, a MnZn ferrite of still smaller core loss may be obtained.

As P is contained 30 ppm or lower for the main component, a MnZn ferrite of small core loss is available.

As P is contained 30 ppm or lower for the main component, a MnZn ferrite of small core loss is also available.

What is claimed is:

1. Mn—Zn ferrite comprising:
   a main component comprising:
      iron oxide 52.5 to 54.0 mol % in terms of $Fe_2O_3$;
      zinc oxide 9.1 to 10.8 mol % in terms of ZnO; and
      the remaining is manganese oxide; and
   sub-components comprising:
      silicon oxide 60 to 140 ppm in terms of $SiO_2$,
      calcium oxide 350 to 700 ppm in terms of CaO, and
      nickel oxide 4500 ppm or lower (not including 0) in terms of NiO.

2. MnZn ferrite as claimed in claim 1, wherein said nickel oxide is included less than 3000 ppm (not including 0) in terms of NiO.

3. MnZn ferrite comprising:
   iron oxide 52.5 to 54.0 mol % in terms of $Fe_2O_3$;
   zinc oxide 7.7 to 10.8 mol % in terms of ZnO; and
   the remaining is manganese oxide; and
   sub-components comprising:
      silicon oxide 60 to 140 ppm in terms of $SiO_2$,
      calcium oxide 350 to 700 ppm in terms of CaO, and
      nickel oxide 4500 ppm or lower (not including 0) in terms of NiO,
   wherein said sub-components further comprise niobium oxide 100 to 350 ppm in terms of $Nb_2O_5$ and zirconium oxide 350 ppm or lower (including 0) in terms of $ZrO_2$ in amounts satisfying the formula $$400\ (ppm) \leq ZrO_2\ (ppm)+2*Nb_2O_5\ (ppm) \leq 800\ (ppm).$$

4. MnZn ferrite claimed in claim 3, wherein said zirconium oxide is contained 50 to 350 ppm in terms of $ZrO_2$.

5. MnZn ferrite as claimed in claim 1, 3, or 4, wherein phosphorus P is contained less than 30 ppm for the main component.

6. MnZn ferrite as claimed in claim 1, 3, or 4, wherein boron B is contained less than 30 ppm for the main component.

7. MnZn ferrite as claimed in claim 2, wherein phosphorus P is contained less than 30 ppm for the main component.

8. MnZn ferrite as claimed in claim 2, wherein boron B is contained less than 30 ppm for the main component.

9. MnZn ferrite as claimed in claim 1, 3, or 4, wherein phosphorus P is contained less than 30 ppm for the main component and boron B is contained less than 30 ppm for the main component.

10. MnZn ferrite as claimed in claim 2, wherein phosphorus P is contained less than 30 ppm for the main component and boron B is contained less than 30 ppm for the main component.

* * * * *